Patented Sept. 12, 1933

1,926,506

UNITED STATES PATENT OFFICE 1,926,506

SULPHONATED DERIVATIVES OF ACYLATED AROMATIC AMINO COMPOUNDS

Richard Wrenshall, Honolulu, Territory of Hawaii

No Drawing. Application August 6, 1932
Serial No. 627,815

10 Claims. (Cl. 260—124)

This invention relates to sulphonated derivatives, including salts thereof, of aromatic amino compounds containing acyl groups derived from the higher fatty acids, and comprises compounds having the general structural formula

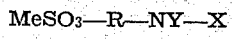

MeSO$_3$—R—NY—X wherein Me is hydrogen or a metal, R is an aromatic nucleus or a substitution product thereof, Y is hydrogen or alkyl and X is an acyl radical of a higher fatty acid; it more specifically comprises compounds wherein the acyl radical of the higher fatty acid is derived from dihydrochaulmoogric acid; and it further comprises processes wherein a higher fatty acid is converted to the corresponding acyl chloride, the acyl chloride caused to react with an aromatic amino compound, and the resulting product sulphonated.

The common water-soluble derivatives of the higher fatty acids, namely those fatty acids containing five or more carbon atoms, and specifically those derived from animal fats and vegetable oils, are generally alkali metal and ammonium salts. Sodium stearate, a soap, is a typical member of this class of compounds. For some therapeutic uses, and for other purposes, it is desirable to have available water soluble compounds of these higher fatty acids which do not have the more pronounced characteristics of the soaps, such as their marked tendency to hydrolyze and thus develop an alkaline reaction.

It is therefore an object of this invention to prepare water-soluble derivatives of the higher fatty acids, which derivatives do not have the undesirable properties associated with the soaps. With this object in view, I have been able to prepare a new class of higher fatty acid derivatives which possess water solubility and substantial freedom from hydrolysis. My new compounds can be characterized as sulphonic acid compounds, and salts thereof, of aromatic amino compounds containing acyl groups derived from the higher fatty acids.

I am aware that others have described aromatic amino compounds containing acyl groups derived from the higher fatty acids, such as stearanilid and other typical members of that series, but these compounds do not have the advantageous properties possessed by my sulphonic acid derivatives. I am also aware that others have prepared water-soluble sulphonated derivatives of certain unsaturated fatty acids. Twitchell's Reagent is an example. My compounds markedly differ from these however for the reason that, in my products, the carboxyl group of the fatty acid is condensed with the amino group of the aromatic amino compound, thus giving me a substituted amide. Twitchell's Reagent contains free carboxyl groups. Moreover, my water-soluble compounds are prepared from saturated or unsaturated higher fatty acids, and are themselves either saturated or unsaturated accordingly. Twitchell's Reagent, on the other hand, is a saturated substance, prepared only by the addition of certain groups and atoms to an unsaturated acid, usually oleic acid.

My compounds comprise the product of condensing a derivative of a higher fatty acid with an aromatic amino compound, whereby a substituted amide is formed, followed by sulphonation of the resulting condensation product. Derivatives of various higher fatty acids can be used. As typical of the class I mention stearyl chloride, palmityl chloride, myristoyl chloride, lauroyl chloride and caproyl chloride. My invention does not, however, embrace members of the lower fatty acids such as formic and acetic; and in the appended claims I mean the term "higher fatty acid" to embrace only those acids derived from animal fats and vegetable oils and which contain at least five carbon atoms. My compounds are, within this designation, not otherwise limited. The higher fatty acid can be saturated or unsaturated.

Various aromatic amino compounds are also embraced within my invention. For example, I can use ordinary aniline, ethyl aniline, amino phenols, the phenetidines or the naphthol amines; and the amino compounds can be either primary or secondary. However, they must, of course, be reactive with acyl chlorides so that the substituted amide can be formed.

In general I find it advantageous to prepare my compounds by causing the corresponding acid chloride of the higher fatty acid to react with an aromatic amino compound, and then sulphonating the substituted amide thus formed. Other ways, however, such as condensation of the acid chloride with a sulphonated aromatic amine can be employed.

One of the typical members of the generic class of compounds embraced within this invention is the water-soluble sulphonic acid derivative of dihydrochaulmoogryl p-phenetidine. This compound has valuable therapeutic uses and I shall describe its preparation in detail. Other compounds embraced within my invention can be prepared in like manner.

In the preparation of the above described dihydrochaulmoogric acid compound, I advantageously treat 100 parts of dihydrochaulmoogric acid with 100 parts of phosphorous trichloride. This is best done by placing the materials in a large flask, warming to dissolve the acid and then allowing the reaction mixture to stand over night at ordinary room temperature. Hydrogen chloride is allowed to escape through a calcium chloride tube connected to the flask. This prevents ingress of moisture but allows the hydrogen chloride to be vented to the atmosphere. Upon completion of the reaction, the excess phosphorous trichloride can be removed by warming the contents under a vacuum, and then about 100 parts of anhydrous ether are added to the contents of the flask. The ether solution of dihydrochaulmoogryl chloride is then carefully decanted from a small quantity of syrupy acids of phosphorus remaining in the flask.

100 parts of freshly distilled p-phenetidine is then dissolved in about 1500 parts of ordinary ether in a large flask and the ether solution of the acid chloride added. The solution is best added with constant stirring and cooling. A heavy cream colored precipitate forms and gradually turns pinkish purple.

The contents of the flask is then filtered by suction and the precipitate, which consists of a mixture of dihydrochaulmoogryl p-phenetidine and p-phenetidine hydrochloride, is cautiously treated with boiling water, added in small quantities at a time, to drive off the adhering ether and to dissolve the p-phenetidine hydrochloride. The insoluble dihydrochaulmoogryl p-phenetidine is filtered off and thoroughly air-dried. After drying, it is dissolved in a small quantity of hot chloroform and filtered. To the clear filtrate, about 1500 parts of 95% alcohol are added, the solution heated to dissolve any precipitate and allowed to stand. After standing, a mass of crystals separates out. They are colorless needles melting at 117° C. and the yield is about 120 grams. The product is pure dihydrochaulmoogryl p-phenetidine.

100 parts of the pure dihydrochaulmoogryl p-phenetidine thus obtained is then slowly added, with stirring, to about 700 to 800 parts of concentrated sulphuric acid kept cold in an ice bath. The amber colored solution is allowed to stand over night at room temperature and it is then slowly added, with constant stirring, to about 500 to 600 parts of 95% alcohol kept cold in a nice bath. The mixture is then slowly poured, with stirring, into about 1550 parts of water, care being taken to prevent rise in temperature.

On standing, the water-soluble sulphonic acid derivative of dihydrochaulmoogryl p-phenetidine separates as a thick greenish-brown layer on top of the alcohol-water-sulphuric acid mixture. This layer is separated from the lower one and is dissolved in about 8000 parts of water. The resulting solution is then advantageously dialyzed in running water until free of sulphuric acid, filtered to remove any sediment, and concentrated by evaporation on a water bath.

The dihydrochaulmoogryl p-phenetidine sulphonic acid thus obtained is an amorphous substance having a color and consistency similar to that of beeswax. It is readily soluble in water and in alcohol but insoluble in ether and benzene. Its sodium salt can be made by carefully neutralizing a water solution of the free acid with sodium hydroxide until alkaline to methyl orange but acid to phenolphthalein.

The reactions employed to prepare this salt, and the analysis thereof, indicate that its structural formula is:

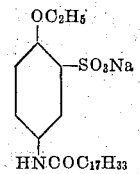

but the sulphonic acid group may also be in the 3-position instead of the 2-position.

As stated above, my invention is not limited to dihydrochaulmoogric acid or to any particular higher fatty acid. It is applicable to all higher fatty acids. For example, I find that the same process, with slight modifications in technique, can be used to prepare water-soluble derivatives of stearic, palmitic, myristic, lauric and caproic acids. As the molecular weights of the acid decrease, the solubilities of the acyl p-phenetidines in ether increase. Therefore, in order to prevent loss of the acyl condensation products it is advantageous to concentrate the ether solutions in the case of the myristoyl and lauroyl phenetidines, and to evaporate the ether solution to dryness in the case of the caproyl phenetidine. When crystallizing the acyl derivatives from alcohol, I find it best to increase the dilution of the alcohol as the molecular weights of the acyl derivatives decrease.

The acyl derivatives just mentioned can be sulphonated as described in the detailed specific example given above. However, the quantity of concentrated sulphuric acid is advantageously decreased with decreasing molecular weight of the acyl derivatives. That is to say, when sulphonating the caproyl derivative, not so much acid is required as when sulphonating one of the higher members in the series.

The sulphonic acids of this series of acyl-p-phenetidines all possess water solubility but the solubility tends to decrease as the molecular weights increase. By solubility, however, I mean that the sulphonic acid compounds form clear and filterable solutions in water but I cannot state positively that these are solutions in contradistinction to hydrosols. The neutral sodium salts of these sulphonic acid compounds are similarly soluble.

As stated above, my invention is not restricted to the use of p-phenetidine since other benzene derivatives having an amino group or a monosubstituted amino group are operative and give useful products. When aniline or ethyl aniline is used I obtain water-soluble sulphonic acids having properties similar to those obtained from p-phenetidine.

In addition to therapeutic uses, especially in the treatment of leprosy, my new compounds are also useful for any purpose where a soluble derivative of a higher fatty acid, which derivative is relatively undissociated and will not react with neutral salts of the metals and alkaline earths, is indicated.

Having thus described my invention, what I claim is:

1. The compounds having the general structural formula

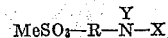

wherein R is an aromatic nucleus, Me is hydrogen or an alkali metal, X is an acyl radical of a higher fatty acid having at least five carbon atoms and being derived from an animal fat or vegetable oil, and Y is hydrogen or alkyl.

2. The products as in claim 1 wherein the acyl radical is that of an acid of the chaulmoogric acid series.

3. The products as in claim 1 wherein the acyl radical is dihydrochaulmoogryl.

4. The sulphonated and acylated p-phenetidines having the most probable formula

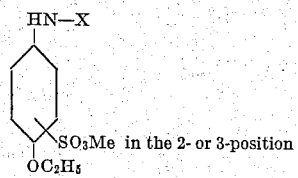

wherein X is an acyl radical of a higher fatty acid having at least five carbon atoms and being derived from an animal fat or a vegetable oil and Me is hydrogen or an alkali metal.

5. The products as in claim 4 wherein the acyl radical of the higher fatty acid is that of an acid of the chaulmoogric acid series.

6. The products as in claim 4 wherein the acyl radical is dihydrochaulmoogryl.

7. The substituted amide having the most probable fomula

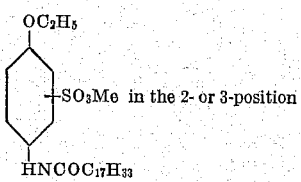

wherein Me is hydrogen or alkali metal, and said products being described as dihydrochaulmoogryl paraphenetidine sulphonic acid, or as the alkali metal salt thereof.

8. The process of preparing derivatives of the higher fatty acids containing at least five carbon atoms and derived from animal fats and vegetable oils, which comprises causing an aromatic amino compound having a reactive hydrogen attached to the amino nitrogen to react with an acid chloride of the fatty acid whereby a substituted amide is formed, and then sulphonating the amide.

9. The process as in claim 8, further extended to the conversion of the sulphonated substituted amide into an alkali metal salt.

10. The process of preparing a useful compound from dihydrochaulmoogric acid which comprises reacting dihydrochaulmoogryl chloride with p-phenetidine and sulphonating the reaction product.  RICHARD WRENSHALL.